US005808177A

United States Patent [19]

Bonnefoy

[11] Patent Number: 5,808,177

[45] Date of Patent: Sep. 15, 1998

[54] METHOD FOR CALIBRATING AND CONTROLLING A DEVICE FOR THE ULTRASOUND DETECTION OF OBJECTS IN THE AIR

[75] Inventor: Pierre Bonnefoy, Cagnes sur Mer, France

[73] Assignee: Imra Europe S.A., Valbonne, France

[21] Appl. No.: 821,002

[22] Filed: Mar. 20, 1997

[30] Foreign Application Priority Data

Mar. 20, 1996 [FR] France .................................. 96 03754

[51] Int. Cl.[6] .................................................... G01N 29/00

[52] U.S. Cl. .............................................................. 73/1.82

[58] Field of Search .................................... 73/1.79, 1.81, 73/1.82; 367/13

*Primary Examiner*—Robert Raevis

*Attorney, Agent, or Firm*—Darby & Darby

[57] ABSTRACT

The invention is related to a method for controlling a device for the ultrasound detection of objects in air, said device comprising a plurality of transducers, used as transmitters and adapted to operate in a phased grid, and at least one transducer, used as a receiver, which are mounted on a support, wherein, prior to at least one detection operation, a calibration step is carried out in order to ascertain a structural phase shift of the transmitter with respect to the reference transmitter, which is then memorized so as to later be able to correct the theoretical phase shifts of the transmitters from the structural phase shift value when shots are ordered later.

12 Claims, 2 Drawing Sheets

2
1
10, RR
ER
2

11
2
1
ER
RR

11
RR
1
ER
RR

METHOD FOR CALIBRATING AND CONTROLLING A DEVICE FOR THE ULTRASOUND DETECTION OF OBJECTS IN THE AIR

FIELD OF THE INVENTION

The invention is related to a method for controlling a device for the ultrasound detection and/or reconnaissance of objects in the air, said device comprising a plurality of ultrasound transmitters adapted to function in a phased grid and at least one receiver mounted on a support. The invention is also related to a method for calibrating such a device.

BACKGROUND OF THE INVENTION

In these devices, transducers are mounted on one of the support surfaces in a generally uniform arrangement. Some of these transducers function as transmitters, whereas others function as receivers. In practice, however, the same transducer can sometimes be used as a transmitter and sometimes as a receiver, or the transmitting and receiving transducers can be separate. Detection shots can be fired by exciting all or some of the transducers, so as to generate a detecting beam, formed by the summation of the individual beams of each transmitting transducer. If an object is found in the detecting beam, then the reflected echo is detected by means of the receiving transducer or transducers. By successively focusing and orienting the beam in different directions, a set of signals is received one after another, which is processed electronically in order to place and/or identify the object.

The focus and orientation can be obtained by displacing and directly orienting the support by mechanical means. However, preferably, the device is fixed during the successive firing shots and the focus and orientation of the detecting beam are achieved by electronically introducing a phase shift in accordance with the relative position of the transmitters, so that the wave resulting from the summation of the waves of each transmitter has an amplitude peak in the desired direction or plane. The precision of the detection shots fired is thus greater and the orientation can be modified faster than is the case with mechanical sweeping. This control method is commonly known as a phased grid operation.

Since the phase shift of each transmitter enables a focused single-phase front in one direction or along a given plane, it can be determined by classic calculations on the basis of the geometrical characteristics of the detection system and from the relative position of the transmitters. Such a method for controlling a detection device and the phase shift calculation steps are described, for example, in the Robotica publication (1984), vol. 2, pages 47–53.

However, it has been noted that monobloc cast transducers, such as are used, for example, for ultrasound detection in liquid or solid environments, are not suitable for detection in air, due to the possibly inadequate impedance adaptation obtained.

Consequently, for ultrasound detection devices in air, one generally uses grids comprised of individual transducers mounted on a support. However, the manufacturing and assembly tolerances of the detection device do not enable adequate precision to be achieved in the relative geometrical positioning of the transducers. Indeed, the dimensions of the structural elements of the transducers, especially of their amplification cones and, if applicable, of their casing, are not exactly identical, but instead they vary from one transducer to another. Also, the assembly of the vibrating diaphragm at the base of the casing, mainly via shock absorbers, causes differences in positioning with respect to the base of the casing. In addition, the support can have an uneven surface. Finally, all these elements are subject to change over time due to wear and tear. Due to all these reasons, the amplification cones of the transducers are thus no longer positioned in the arrangement envisioned, for example, with their amplification cones located in the same plane or along the same known surface; instead, they are offset with respect to their theoretical arrangement.

These manufacturing tolerances and these position modifications, over time, mainly cause undesirable deviations between the transducers and irregularities in the phase shift signals. Also, the main lobe of the detection signal loses its directionality and the secondary lobes increase. The precision of the detection measurements is thus reduced.

Some of the disadvantages mentioned hereinabove have already been recognized in the above cited publication, but no solutions for these have been offered up until now.

SUMMARY OF THE INVENTION

It is an object of the invention to provide a method for controlling a detection device that overcomes the above cited disadvantages, especially the lack of precision in the measurements and, more specifically, a method that compensates for the structural phase shifts in the geometrical positioning of the transducers.

Another object of the invention is to provide a method for controlling a detection device that can be implemented for a device wherein the transducers are mounted on the support in accordance with high manufacturing tolerances, as in the case of inexpensive manufacturing items.

Yet another object of the invention is to provide a method for calibrating a detection device such as mentioned hereinabove.

To this end, the method as per the invention for controlling a device for the ultrasound detection of objects in air comprises a plurality of transducers on a support that are used as transmitters and adapted to function in a phased grid and at least one transducer that is used as a receiver, wherein the detection operations consist of the following steps:

- shots are fired by exciting all or some of the transmitters, so as to generate successive detection beams, formed by the summation of the individual beams of each transmitter, and by introducing successive phase shifts between the transmitters, so as to orient and focus the beam each time in accordance with such phase shifts;
- each time that it is applicable, an echo signal, which is received by the receiver(s) when the detection beam is reflected by an object, is detected;
- all the signals that are received are processed so as to position and/or characterize the object;

The method is characterized in that, prior to at least one detection operation, a calibration operation comprising the following steps is undertaken:

- a reference transmitter and a reference receiver are selected;
- for each of the other transmitters, a succession of calibration shots are fired one after another on a target, by jointly exciting this other transmitter and the reference transmitter and by sweeping the transmitting phase shift range from 0° through 360°, and the signal amplitude received by the reference receiver is measured;
- the structural phase shift of the transmitter is ascertained with respect to the reference transmitter, said phase shift being the maximum of the signal amplitude received;

the structural phase shift of each of the transmitters is memorized;

and by the fact that the theoretical phase shifts of the transmitters are corrected later from the value of their structural phase shifts when shots are fired at a later point.

The reference transmitter is advantageously located in a central position with respect to all the transmitters, so as to favor symmetry in the detection signals.

According to a first embodiment, the reference receiver is a receiver that is external to the device constituting the target and located across from the device.

According to another embodiment, the reference receiver is the, or one of the receiving transducers of the device, the target being a smooth geometrical surface located across from the device.

The geometry of the device is preferably such that the receivers are arranged at the periphery of the phased grid, with the transmitter or transmitters being at the center or vice versa.

According to one calibration method known as distant field approximation, the target can be located at a distance that is close to the range of the device (distant field approximation calibration method).

According to another calibration method, known as half-range range calibration, the reference receiver, which is external to the device, can be located at a distance corresponding to half of the range of the device, or the smooth geometrical surface can be located at a distance corresponding to a quarter of the range of the device, so as to minimize errors caused by focusing.

The structural phase shift of each of the transmitters can also be corrected by taking into account the distance of the transmitter with respect to the reference transmitter and from the distance of the target.

The phase shift can be varied continuously or in increments. In either case, the structural phase shift of each of the transmitters can be determined either as the phase shift corresponding to the maximum amplitude value received by the reference receiver or as the maximum value of a curve that smoothes the amplitude values received by the reference receiver or as the minimum value of the curve by adding the opposition phase shift of 180°.

It is also possible, as per the invention, to undertake an additional power calibration, comprising the following additional steps:

a reference transmitter and a reference amplitude are selected;

successively, for each of the transmitters, a succession of shots are fired on a target by varying the intensity of excitation and the amplitude received is measured;

an excitation intensity, called the reference intensity, is ascertained for each of the transmitters as being the structural excitation intensity, for which the amplitude received is the reference amplitude;

an excitation intensity correction factor is calculated for each of the transmitters as being the ratio of the reference excitation intensities of the reference transmitter and of this transmitter;

the correction factor of each of the transmitters is memorized;

and wherein the excitation intensity of the transmitters is then corrected by their correction factors when shots are ordered later, so that all the transmitters transmit at the desired power levels.

Preferably, for the power calibration, the reference intensity is selected at a value that is lower than the maximum structural intensity of the transmitter having the lowest impedance factor.

The invention is also related to a calibration method for a device for detecting objects, comprising a plurality of transmitting transducers adapted to function in a phased grid and at least one receiving transducer mounted on a support, which is characterized by the fact that, prior to at least one detection operation, a calibration operation as per the characteristics described hereinabove is undertaken.

BRIEF DESCRIPTION OF THE DRAWINGS

The invention will be better understood from the description that follows of one embodiment of the method as per the invention, implemented with reference to the drawings wherein.

DETAILED DESCRIPTION OF THE INVENTION

Figure 1:
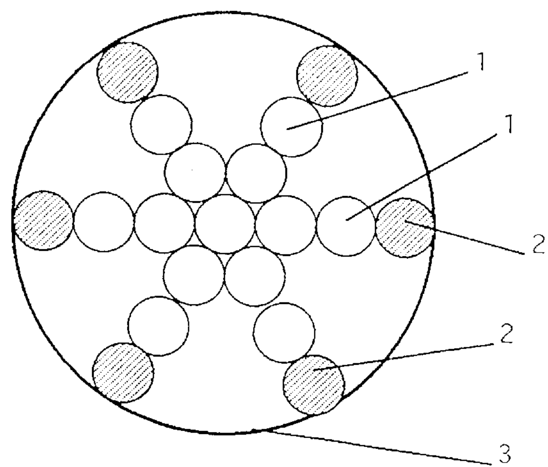
FIG. 1 shows a partial schematic view of a detection device with an assembly of transmitting transducers and/or receivers mounted on a support.

FIG. 1 represents an assembly of ultrasound transmitting transducers 1 and receiving transducers 2 mounted on a support 3, constituting an element of the ultrasound object detection device.

Figure 2:
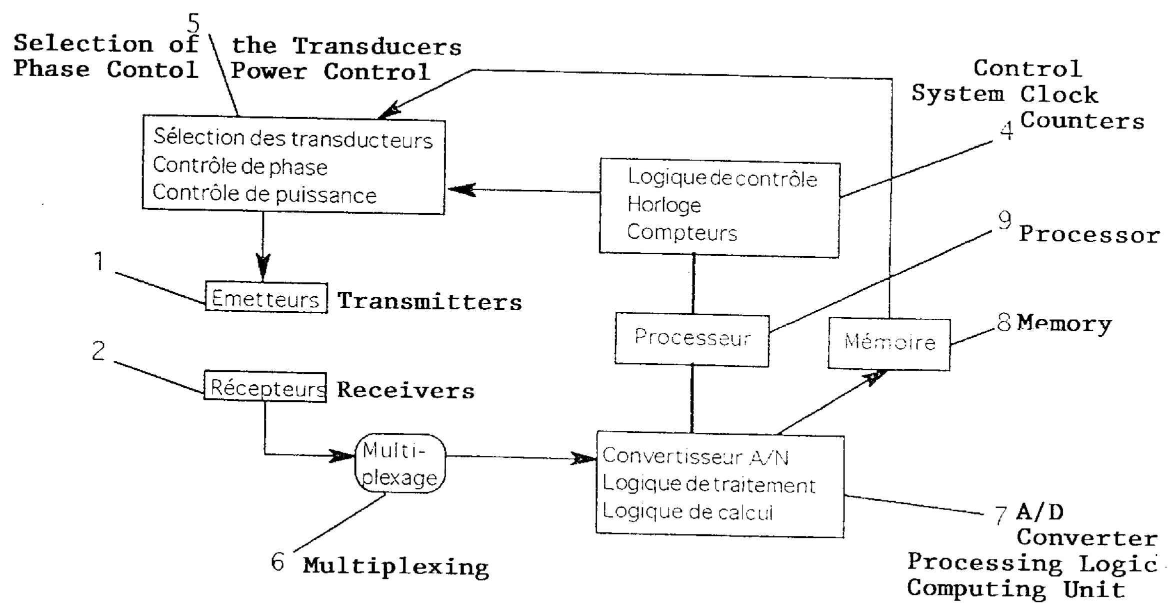
FIG. 2 shows a block diagram of a device that enables the implementation of the control and/or calibration method as per the invention.

In addition, the detection device comprises, as has been represented schematically in FIG. 2, an assembly of means 4 comprising a control system, a clock and counters, means 5 for selecting and controlling the power and the phase of transmitters 1, means 6 for transferring the signals collected by detectors 2, for example, via multiplexing, as represented, means 7 for processing such signals, comprising an analog/digital converter and a computing unit with a memory 8. The assembly is controlled by a processor 9. Such devices are known in the detection and/or reconnaissance of objects.

In order to reduce costs, transmitters 1 are mounted on support 3, for example, by embedding, with substantial manufacturing tolerances, that are due especially to the variations in gradients between the amplifier element and the casing, as well as due to the assembly of the vibrating diaphragm of the transducers on the shock absorbers. The manufacturing tolerances cause phase shifts between the various transmitters with respect to the theoretical arrangement envisioned. These phase shifts in turn cause interferences (reduction in directionality, loss of power in the main lobe, appearance and increase of secondary lobes) in the detection beam comprised of the individual beams of the transmitters with respect to the theoretical beam, thus having a detrimental effect on detection quality and resolution.

The inventive method for controlling such a device overcomes these problems by the fact that a calibration operation is undertaken prior to at least one detection operation. The calibration operation may be undertaken just once after the device is manufactured and before it is placed in operation. Preferably, however, the calibration step is undertaken more frequently during the operation of the device, for example, each time that it is used, or after it has been in service for predetermined period.

Figure 3:
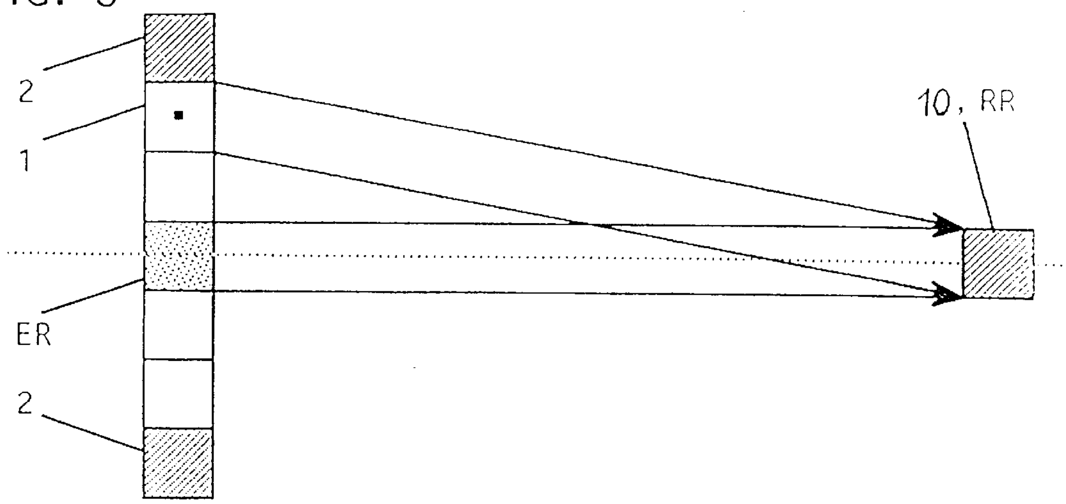
FIG. 3 shows a schematic view of a first arrangement enabling the implementation of the inventive method.
Figure 4:
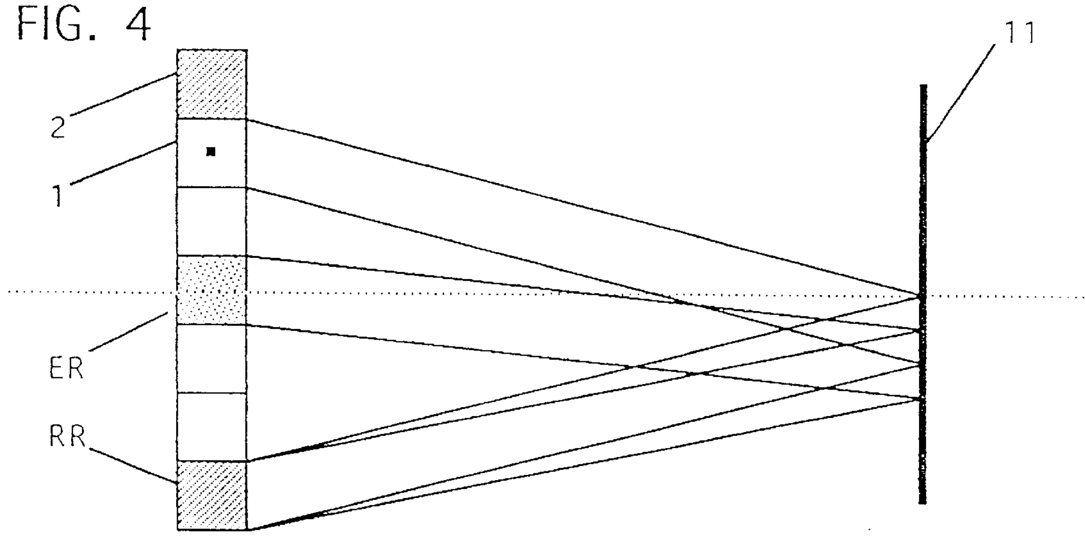
FIG. 4 shows a schematic view of a second arrangement enabling the implementation of the inventive method.
Figure 5:
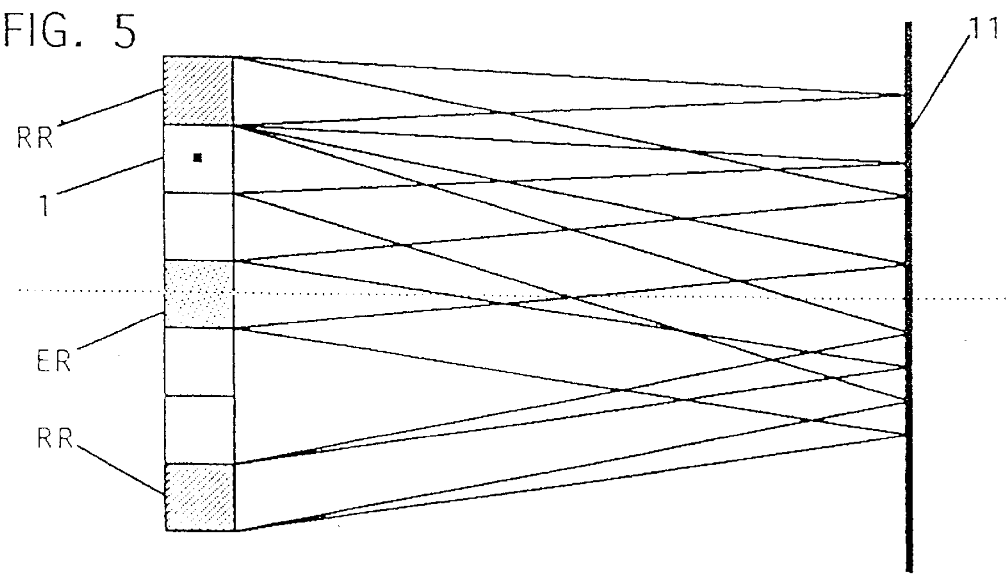
FIG. 5 shows a schematic view of a third arrangement enabling the implementation of the inventive method.

In order to carry out the calibration step, a target, that can be a receiver 10 fulfilling the functions of the reference receiver RR as represented in FIG. 3, or a smooth geometrical surface 11, is arranged across from transmitters 1 of support 3, the or one of the receivers of the device being therefore selected as the reference receiver RR, as represented in FIG. 4. According to an embodiment variation of FIG. 4, several receivers are selected as reference receivers, for example two, as represented in FIG. 5.

From among the transmitters 1, one reference transmitter ER is selected. Preferably, one of the transmitters 1 that is located in a central position is selected, so as to minimize the distortion due to the distancing of the other transmitters with respect to this reference transmitter ER during the calibration step.

In the arrangement of FIG. 3, the reference receiver RR is quasi-punctual and this fact introduces an error due to the fact that generally, in a distant field approximation, it is believed that the detection beam transmitted towards the receiver is parallel, whereas in actuality, it is focused due to the distancing of the individual transmitters on the support. However, this error is minimal, especially when the reference receiver is located at a distance from support 3 that is close to the range of the detection device.

In a variation, in order to minimize this error, the reference receiver RR can be located at a distance that corresponds to half the range of the detection device.

The range of the device is ascertained in accordance with the power of the transmitters, the quality of the ambient atmosphere and the configuration of the objects to be identified or reconnoitered.

The arrangement of FIG. 4 ensures that an additional receiver 10 need not be used. The smooth geometrical surface 11 is a planar or another type of surface, for example, a corner.

In this arrangement as well, there may be an error due to the distant field approximation, but this is negligible. However, in order to minimize this error, the smooth geometrical surface can be located at a distance that corresponds to a quarter of the range of the detection device.

In FIG. 5, the use of two reference receivers RR enables the lack of symmetry of the arrangement to be compensated, for example, when the target is not located directly across from the detection device.

In the arrangements of FIGS. 3 through 5, the error due to the distant field approximation can also be compensated by introducing a correction factor for each of the transmitters, said correction factor being predetermined as per its distance with respect to the reference transmitter ER and the distance of the reference receiver 10 or the smooth geometrical surface 11.

For each of the transmitters 1, with the exception of the reference transmitter ER, a succession of calibration shots are fired successively on target 10 or 11 by jointly exciting such transmitter 1 and the reference transmitter ER, and by sweeping the transmitting phase shift range from 0° through 360°. For each of these shots, the amplitude of the signal received by the reference receiver RR is measured. This determines the structural phase shift of each of transmitters 1 with respect to the reference transmitter ER, as the one that corresponds to the maximum amplitude of the echo signal.

Sweeping may be done continuously, or in increments. In either case, the maximum amplitude can be determined as the maximum value measured or as the maximum of a curve smoothing the measured values. One can also determine the phase shift from the minimum amplitude by introducing a shift of 180°.

The structural phase shift of each transmitter is then memorized, so as to later correct the theoretical phase shifts of the transmitters from the value of the structural phase shift when firing shots are ordered later.

When target 10 is not placed exactly in the median axis of the device or when target 11 is not placed exactly perpendicularly to the median axis of the device, a measurement error occurs, due to the differences in the trajectory between the transmitters and the receiver or receivers. If the relative values are measured, a positioning error of a few degrees (preferably less than 5 degrees) is acceptable in practice. In this case, the positioning is approximate, but the relative measurements are precise.

In case absolute values are measured, it is possible to verify the precision of the placement symmetrically, by comparing the difference in pace along two different and symmetrical trajectories. For example, in the embodiment of FIG. 3, one can compare the difference in pace between each of two transmitters distanced from the median axis of receiver 10. In the embodiments of FIGS. 4 or 5, one can measure the difference in pace between the reference transmitter ER and each of the two receivers that are the furthest from the median axis.

What is claimed is:

1. A method for controlling a device for the ultrasound detection of objects in air comprising a plurality of transducers used as transmitters adapted to function in a phased grid and at least one transducer adapted to function as a receiver mounted on a support, said method comprising the steps of:

(a) firing shots by exciting all or some of the transmitters so as to generate successive detection beams, formed by the summation of the individual beams of each transmitter, and by introducing successive phase shifts between the transmitters so as to orient and focus the beam each time in accordance with the phase shifts;

(b) detecting each time that it is applicable, an echo signal received by the receiver or receivers detecting when the detection beam is reflected by an object;

(c) processing all the signals received are processed in order to position or characterize the object;

(d) then, prior to a detection operation, a calibration operation consisting of the following steps is carried out:

(1) a reference transmitter (ER) and at least one reference receiver (RR) are selected;

(2) for each of the transmitters with the exception of the reference transmitter, a succession of calibration shots are fired one after another and the amplitude of the signal received by the reference receiver or receivers (RR) is measured;

(3) a structural phase shift of transmitter with respect to the reference transmitter (ER) is ascertained as one that corresponds to the maximum signal amplitude detected;

(4) the structural phase shift of each of transmitter(s) is memorized, wherein the calibration shots are fired on a target by jointly exciting this other transmitter and the reference transmitter (ER) and by sweeping the transmitting phase shift from 0° through 360°, in that the theoretical phase shifts of transmitters are later corrected from the value of their structural phase shifts when firing shots are ordered later and in that the receiver(s) are located at the periphery of the phased grid and the transmitters at the center, or vice versa.

2. The method of claim 1, wherein the reference transmitter (ER) is located in a central position with respect to all the other transmitters.

3. The method of claim 1, wherein the target is a receiver constituting the reference receiver (RR) and is located across from the transmitters.

4. The method of claim 3, wherein the target is located at a distance close to the range of the device.

5. The method of claim 3, wherein the receiver constituting the reference receiver (RR) is located at a distance corresponding to half the range of the device.

6. The method of one claim 1, wherein the reference receiver(s) (RR) are at least one of the receiver transducers of the device, the target being a smooth geometrical surface located across from the device.

7. The method of claim 4, wherein the smooth geometrical surface is located at a distance corresponding to a quarter of the range of the device.

8. The method of claim 1, wherein the structural phase shift of each of the transmitters is corrected by taking into account the distance of the transmitter with respect to the reference transmitter (ER) and the distance from the target.

9. The method of claim 1, wherein the structural phase shift of each of the transmitters is ascertained as the phase shift corresponding to either the maximum amplitude value received by the reference receiver or the maximum value of a curve smoothing the amplitude values received by the reference receiver or the minimum value of the curve by adding 180°.

10. The method of claim 1, wherein in addition, a power calibration is undertaken, comprising the steps of:

(a) selecting a reference transmitter (ER') and a reference amplitude;

(b) firing a succesion of shots one after another, for each of transmitters on a target, by varying the excitation intensity, and measuring the amplitude received;

(c) ascertaining a so-called reference excitation intensity for each of the transmitters, as being the structural excitation intensity for which the amplitude received is the reference amplitude;

(d) calculating a correction factor for the excitation intensity of each of the transmitters as being the ratio of the reference excitation intensities of the reference transmitter (ER') and of this transmitter;

(e) memorizing the correction factor for each transmitter; and correcting the excitation intensity of the transmitters by their correction factors when firing shots are ordered later, such that all the transmitters transmit at the desired power levels.

11. The method of claim 10, wherein the reference intensity selected is a value that is less than the maximum structural intensity of transmitter having the lowest impedance factor.

12. A calibrating method for a device for detecting objects comprising a plurality of transmitting transducers adapted to function in a phased grid, and at least one receiving transducer mounted on a support wherein, prior to at least one detection operation, a calibration operation in accordance with claim 1 is undertaken.

* * * * *